Patented Jan. 13, 1931

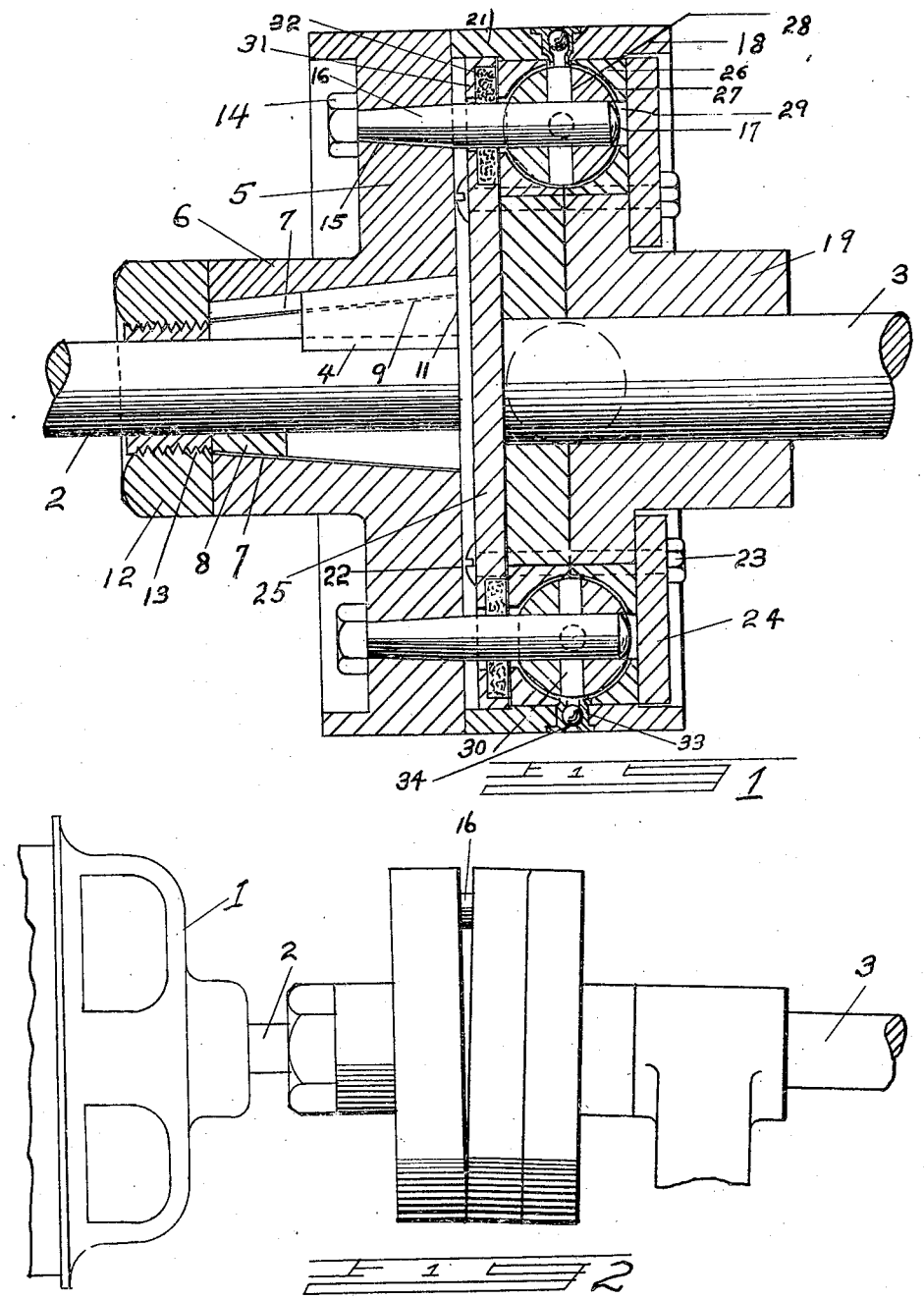

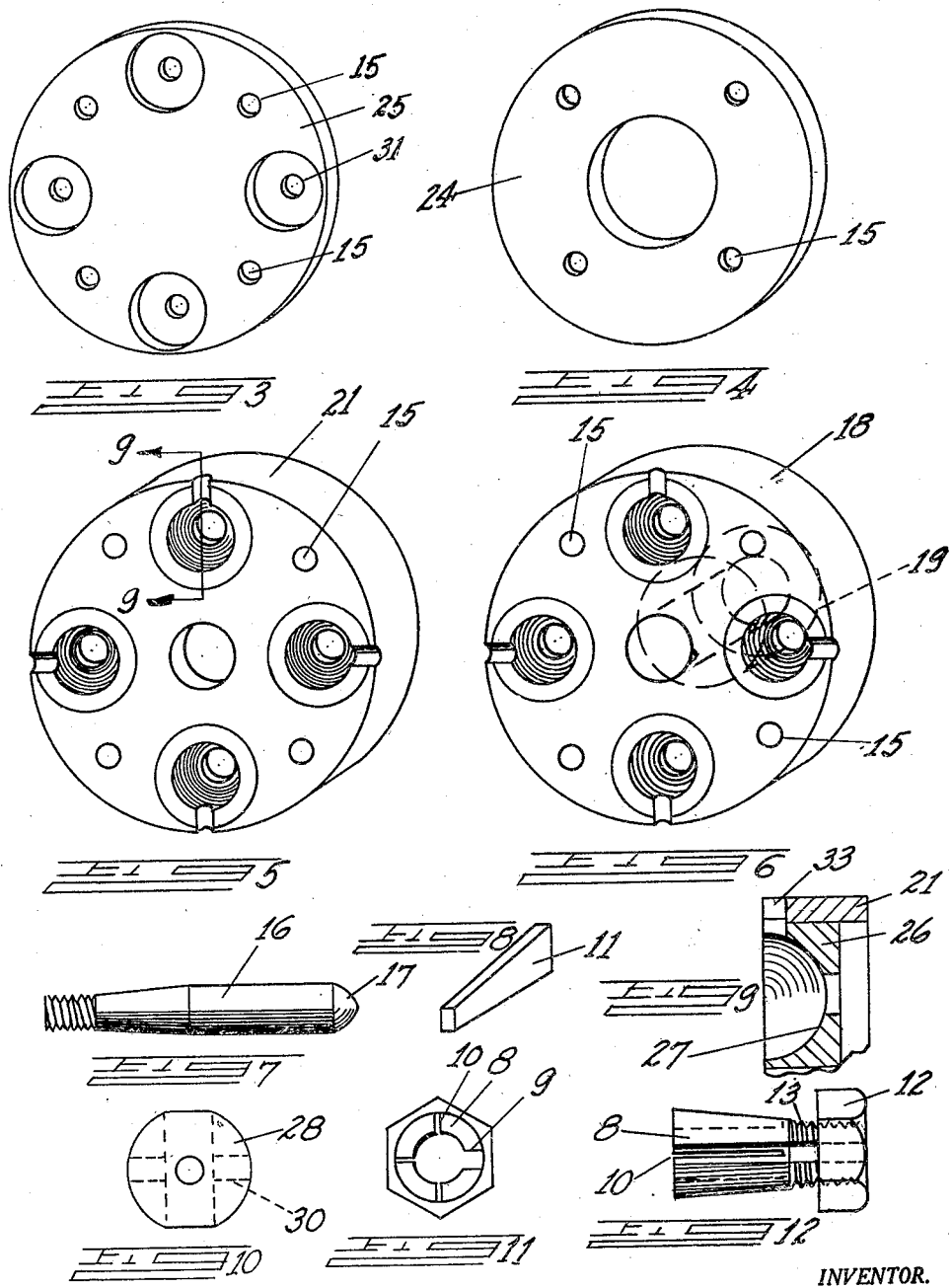

1,788,741

UNITED STATES PATENT OFFICE

JOHN H. REEDY, OF HAMILTON, OHIO

FLEXIBLE COUPLING

Application filed June 4, 1928. Serial No. 282,537.

My invention relates to flexible couplings and particularly to the type which will connect driving and driven shafts which are not in axial alignment without undue strain on the driving or driven parts.

It is the object of my invention to provide a flexible coupling which will allow a wide range of misalignment between a driving and a driven shaft. It is further an object of my invention to provide a housing for the flexible coupling which may be packed with lubricant and which will be substantially grease leak-proof. Another object is the provision of a novel combination of mounting parts which will enable one or both of the pair of flanges which house the coupling to be quickly and securely mounted on a keyed shaft such as that with which practically every type of motor is provided.

In a great many machines the gradual wear of the parts makes frequent changes in the axial position of the shafts necessary. The driving parts or the shaft of the driving motor are therefore frequently put under a severe strain. Since the supports for the motors are not readily changed it frequently becomes necessary to vary the alignment of the motor. It is an object of my invention to provide a flexible coupling which may be quickly attached to the drive shaft of a motor, the axial alignment of which has to be changed, or which may be readily mounted on a new motor which is not in axial alignment with the shaft it is to drive.

The above and other objects to which reference will be made in the ensuing disclosure I accomplish by that certain combination and arrangement of parts of which I have shown a preferred modification.

In the drawings:—

Figure 1 is a sectional view of my flexible coupling.

Figure 2 is a side elevation of my flexible coupling in operative position.

Figure 3 is a perspective view of one of the coupling housing retaining plates.

Figure 4 is a perspective view of the other retaining plate.

Figure 5 is a perspective view of the plate which is attached to one of the flanges of which the coupling is composed.

Figure 6 is a perspective view of the flange to which the plate is attached.

Figure 7 is a side elevation of one of the coupling pins.

Figure 8 is a perspective view of the key.

Figure 9 is a sectional view of the plate shown in Figure 5 taken along the lines 9—9 in this figure.

Figure 10 is a side elevation of one of the balls which is mounted within the coupling casing.

Figure 11 is an end elevation of the tapered split bushing and lock-nut assembly.

Figure 12 is a side elevation of the assembly shown in Figure 11.

Referring first to Figure 2 I have shown a motor 1 having a shaft 2 which we will assume is not in axial alignment with the driven shaft 3. It is the object of the invention to provide a coupling for connecting driving and driven members such as are illustrated in this figure.

Referring now to Figure 1, the motor shaft will ordinarily be provided with a key way such as is indicated at 4. The coupling is composed of two flanges with a circular plate secured to one of the flanges forming therewith a casing or housing for the ball bearings of the assembly. I have shown the flange 5 having the hub 6 mounted on the driving shaft 2. In order to provide a mounting for the flange 5 I bore out the flange and hub with a tapered aperture 7. Fitting within this aperture I have shown the tapered bushing 8 having the key way slot 9 and the expansion slots 10. The tapered bushing is aligned within the tapered aperture so that its slot 9 will be aligned with the shaft key way 4.

The key 11 is then inserted and the lock-nut 12, which has been previously placed on the shaft 2, is secured within the threads 13 at the small end of the tapered bushing. It will be obvious that the more the nut 12 is tightened the tighter the bushing 8 will be drawn within the tapered aperture and the tighter the bushing will be secured on the motor shaft.

Secured with nuts 14 within the radially spaced holes 15 in the parts of the assembly are the tapered pins 16 which have rounded ends 17 which provide the driving connection with the driven part of the coupling. The driven part of the coupling is composed of the flange 18 which has a hub 19 for a driven shaft, such as is indicated at 3 in Figure 2.

A circular plate 21 is attached to the flange 18 with bolts 22 and nuts 23. The bolts not only secure the plate 21 and flange 18 together, but they also secure the retaining plate 24 in position against the flange 18 and the retaining plate 25 in position against the plate 21.

The retaining plates form a grease tight assembly. Into the opposed meeting faces of the flange 18 and plate 21 there are mounted a series of bushings 26 having rounded semi-spherical recesses 27 which seat the ball bearings 28. The bearings have apertures 29 into which the rounded ends 17 of the coupling pins extend. The bearings also have lubricant passages 30 which allow the lubricant to thoroughly permeate all the bearing surfaces. As the plate 21 and the flange, during the rotation of the shafts, pass through varying planes the openings 31 through which the pins 16 extend cannot be snug fitting so a felt washer 32 is inserted so that it will form a grease-proof seal around the pins.

For providing lubricant a series of apertures 33 are formed extending in from the peripheries of the flange and plate. Within the apertures I have secured grease fittings 34 which may be lubricated with a grease gun.

The coupling thus formed may be modified from the specific structure illustrated without departing from the inventive principle involved. For example, the spherical pockets for seating within the ball bearings may be formed directly in the faces of the flange and plate without the use of independent bushings. Such a modification, it is thought, will be apparent without illustration.

Having thus described my invention, what I claim as new and desire to secure by Letters Patent, is:—

1. A flexible coupling having a pair of members with meeting faces within which a series of semi-spherical recesses are formed, an independent member forming a component part of the coupling having a series of pins extending from its face, and ball bearings having recesses for retaining the ends of said pins retained within said recesses, and means for making of said pair of members a grease leak-proof assembly.

2. A flexible coupling having a pair of members with meeting faces within which a series of semi-spherical recesses are formed, an independent member forming a component part of the coupling having a series of pins extending from its face, and ball bearings having recesses for retaining the ends of said pins retained within said recesses, and means for making of said pair of members a grease leak-proof assembly comprising a plate having apertures through which said pins extend having washers sealing the passages therethrough.

3. A flexible coupling having a pair of members with meeting faces within which a series of semi-spherical recesses are formed, an independent member forming a component part of the coupling having a series of pins extending from its face, and ball bearings having recesses for retaining the ends of said pins retained within said recesses, said bearing having lubricant passages extending therethrough and means for lubricating said recesses.

4. A flexible coupling having a pair of members with meeting faces within which a series of semi-spherical recesses are formed, an independent member forming a component part of the coupling having a series of pins extending from its face, and ball bearings having recesses for retaining the ends of said pins retained within said recesses, said bearing having lubricant passages extending therethrough and means for lubricating said recesses, and means for mounting said independent member on a motor shaft comprising a tapered bushing with means for drawing said tapered bushing tightly on said shaft.

JOHN H. REEDY.